Apr. 3, 1923.
C. E. HENRIOD
GRADUAL CHANGE GEAR
Filed Feb. 28, 1922
1,450,595
2 sheets-sheet 1
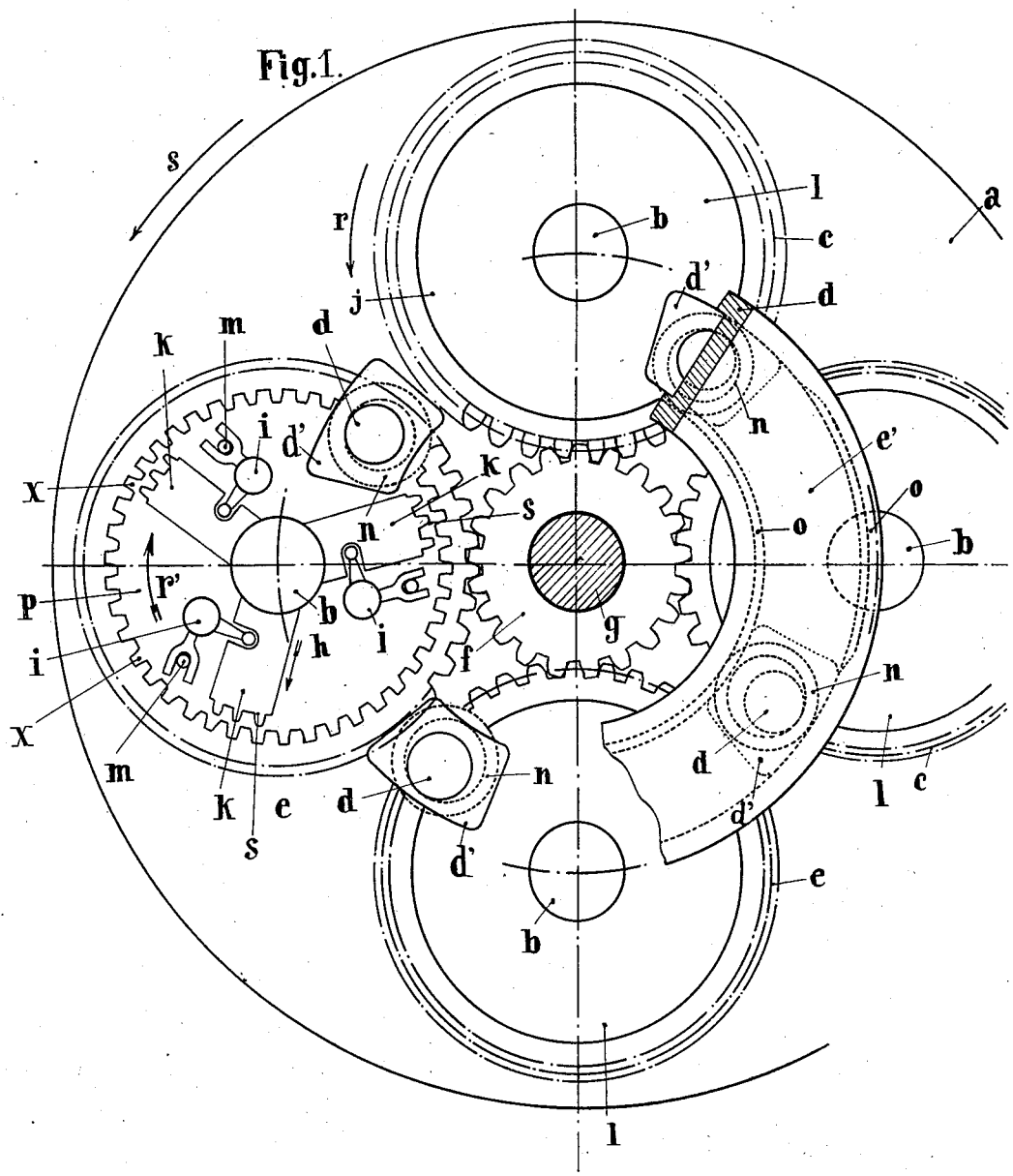
INVENTOR:
Charles Edouard Henriod
BY
ATTORNEY Apr. 3, 1923.  1,450,595
C. E. HENRIOD
GRADUAL CHANGE GEAR
Filed Feb. 28, 1922  2 sheets-sheet 2
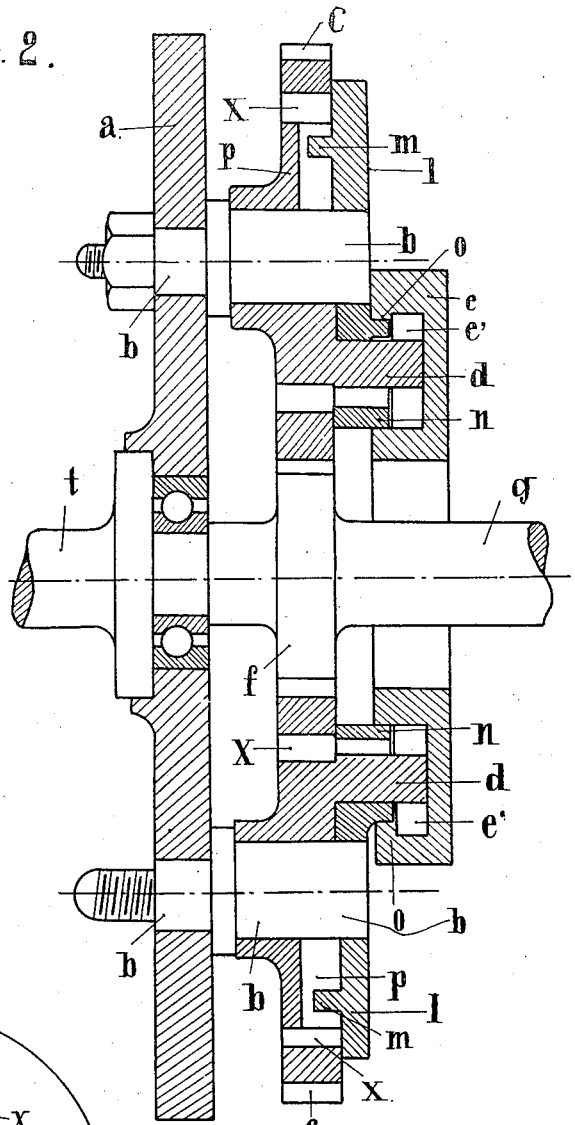
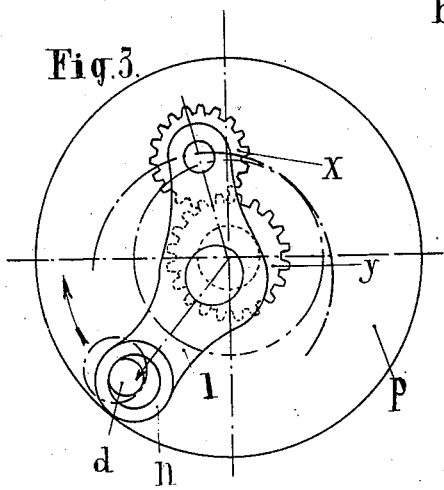
INVENTOR
Charles Edouard Henriod
BY
ATTORNEY Patented Apr. 3, 1923.

1,450,595

UNITED STATES PATENT OFFICE.

CHARLES EDOUARD HENRIOD, OF LAUSANNE, SWITZERLAND.

GRADUAL-CHANGE GEAR.

Application filed February 28, 1922. Serial No. 540,007.

*To all whom it may concern:*

Be it known that I, CHARLES EDOUARD HENRIOD, a citizen of the Republic of Switzerland, and resident of 10 Ave Juste Olivier Lausanne, Canton of Vaud, Switzerland, have invented a new and useful Improvement in Gradual - Change Gears, which improvements are fully set forth in the following specification.
My invention relates to certain improvements introduced in gradual change gears of the type where a motor flywheel revolving at the motor's speed carries planetary or epicyclic gears with outer teeth engaging a central wheel, such central wheel being keyed on the resistance to be driven at gradually variable speeds.

The object of my invention is to provide devices permitting: either to lock the planet gears against rotation or to impart to them oscillations of variable amplitude so as to make the resistance gradually pass through all the speeds from the motor speed (direct drive) to stop, with gradual reverse, a single direction of the planetary oscillation being used to act on the resistance as will be hereinafter explained.

In order to make my invention more clearly understood, I have appended hereto a drawing illustrating, as an example, a motor flywheel fitted with gradual change-speed gearing constructed according to my invention.

In the said drawing:
Figure 1 is a front view of the motor flywheel showing the arrangement of the planetary gears; in this view, the front plate constituting the fixed part is partly broken away.
Figure 2 is a cross section of the device.

Figure 3 is a view of a modified planetary gear.

The gradual change speed flywheel comprises two principal parts:
1, the movable flywheel proper $a$ with its planet gears; and 2, a plate or cover $e$ located in front of the flywheel and constituting the fixed part in which grooves or ways are provided, the purpose of which will be apparent presently. Said plate is adapted to be put more or less out of center relating to the driving or flywheel shaft $t$ by the action of a control (not shown) operated by the driver.
In the drawing I have shown on flywheel $a$ four planetary gears, but it should be understood that this number is in no way absolute, being adopted here merely as an example.

Each planetary gear comprises a crown or ring which is toothed outside at $c$ and inside at $x$ and which can freely revolve around a plate $p$ encircled thereby and loosely mounted on a shaft $b$, the latter penetrating into the flywheel and made fast thereto by any suitable means, a nut for instance.

The outer teeth $c$ of each ring gear mesh with the central toothed wheel $f$ which is keyed on the driven shaft $g$ disposed in axial alinement with the drive shaft $t$.

Opposite each plate $p$ and mounted idle on shaft $b$, is a plate $l$ carrying fingers $m$. On said fingers fit forks forming parts of bell cranks $i$ the axles of which are mounted on plate $p$. The other arms of the bell cranks project into notches made in parts $k$ radially arranged and having on their periphery teeth or cogs adapted to mesh with the inner teeth $x$ of the ring gear. Parts $k$ are adapted to be moved radially and to slide between suitable guides (not shown) provided on plate $p$. Each plate $p$ carries a finger $d$ which, like finger $n$ of plate $l$, projects into an annular groove or track $e'$ in the shiftable part $e$, the eccentric position of which imparts to the two plates $l$ and $p$ oscillating motions of different amplitudes, causing these two plates to be moved relatively to one another. Finger $n$ is hollow and through it passes the other finger $d$. During rotation of the flywheel, finger $n$ moves within a track or way provided in part $e$ such track being given for a quarter of its circumference a slight deviation shown at $o$ (Figure 1) with relation to track $e'$ in the same part $e$, along which track $e'$ moves the head $d'$ of finger $d$. The disposition of head $d'$ in track $e'$ has the obvious effect of preventing rotation of plate $p$ about its shaft $b$.

Supposing plate $e$ is so positioned that its center coincides exactly with the axis of the driving or flywheel shaft $t$, circular track or way $e'$ along which moves the head $d'$ of each finger $d$ is completely centered relatively to the flywheel; and the fingers $d$, driven by the flywheel rotation, describe a circle around the center of the flywheel. But the track $o$ in which move the hollow fingers $n$ is, for a quarter of its circumference, slightly out of center with relation to shaft $g$, such eccentricity being equal to the amount by which the two paths or ways are out of true with relation to one another. Hence, therefore, fingers $n$ while travelling over the quarter of the circumference of track or way $o$ out of center with relation to path or way $e'$ will displace the plates $l$ which by means of fingers $m$ displace the bell crank levers $i$ and the slides $k$ will thereby be caused to move in the direction of arrow $h$ into mesh with the inner teeth $x$ of each ring gear, as and when the finger $n$ of the respective plate $l$ travels over the eccentric part of track or way $o$.

The result is, that the ring gears are successively locked to the corresponding plates $p$; but since the said plates cannot turn about their axes, their fingers $d$ will travel in a path, during the rotation of the flywheel, which is perfectly concentric with the axis of the flywheel. The fingers $d$ have play in the holes of fingers $n$, whereby movement of fingers $n$ with relation to fingers $d$ is made possible. When the ring gears are not locked to the plates $p$, they turn freely and roll around the resistance gear $f$ without exerting any action thereon. On the other hand, when one of the ring gears is locked to the corresponding plate $p$, that gear can no longer turn freely; hence, it can no longer roll around the resistance gear $f$, but drives said resistance gear at the speed of the flywheel, the outer teeth $c$ in mesh with the teeth of gear $f$ acting as clutches and rotating said gear $f$. And since there are four planet gears, and since the ring gear of each of them is locked to the corresponding plate $p$ during one quarter of a revolution, there will always be one planet gear which will drive the resistance gear $f$, the ring gears of the other three planet gears rolling idly around the resistance gears without effecting any driving action. This is the direct drive.

If now, by means of any suitable mechanism, plate $e$ is moved into eccentric relation to the shaft $t$ of the flywheel the heads $d^1$ of fingers $d$ which run along track or way $e^1$ will impart to the plates $k$ a rocking motion on themselves, the amplitude of such motion depending on the degree of eccentricity given to plate $e$ or more precisely, to track $e^1$. Now it will be apparent that, if any one of the planetary pinions is considered, when finger $n$ on the plate $l$ of that pinion travels over the part of path $o$ out of true regarding track $o$ which is eccentric to track $e'$, the slides $k$, will act, as before, to lock plate $p$ to the corresponding ring gear; but since at that moment the plate $p$ rocks on itself in one direction, it will exert a retarding action on the central resistance gear $f$. As soon as finger $n$ leaves the eccentric part of track $o$ the slides $k$ will release the ring gear of the planetary pinion considered, the rocking of which in inverse direction has no action on the resistance gear, the ring gear of said planetary pinion being completely idle.

The speed of central pinion $f$ will decrease as the extent of eccentricity increases: when the degree of eccentricity is such that during rotation of the flywheel the planetary gears merely roll around the resistance gear, the latter will not be revolved at all and the driven shaft will remain motionless: this is stoppage.

Between those two limits "direct drive" and "stop" a range of working speeds can be obtained by modifying the degree in which the tracks are eccentric with relation to the driving shaft.

Beyond the eccentricity corresponding to stoppage of the drive, if the degree of eccentricity is increased, reverse is obtained and the speed of this reverse becomes greater, as the eccentricity increases. Rotation of pinion $f$ in the inverse direction is produced by the fact that inasmuch as the development of the arcs of the planetary pinion running on the resistance is greater than the development of the total circle of latter $f$, this pinion must of necessity revolve in inverse direction for a continuation of the whole motion.

As is now apparent, the characteristic feature of my invention is the fact that the plate $p$ and the associated ring gear can be locked and unlocked. Instead of effectuating the locking and unlocking by means of bell cranks $i$ and slides $k$, I can use any other suitable arrangement, as, for instance, the device illustrated by Figure 3.

With this embodiment, an idle plate $p$, carrying a finger $d$, can revolve freely on the hub of a central gear $y$ integral with the planetary pinion proper which, as in the previous case, meshes with resistance gear $f$. A second plate I reduced here to two bent arms carries a sleeve or hollow pin $n$ through which passes finger $d$. Pin $n$ and finger $d$ move, as previously, along paths or ways provided in part $e$. One of the arms I carries a gear X mounted idle on its axle. The parts are so positioned that when the paths are concentric pinion X revolves freely, without acting on wheel $y$. This corresponds to the direct drive hereinbefore indicated. As soon as the paths are put into eccentric relation, the rocking, of plates $p$ and I will be effected as previously, and pinion X being jammed on gear $y$ will cause the latter to revolve through a distance depending on the amplitude of the rocking.

Having now particularly described and ascertained the nature of my said invention and the manner in which the same is to be performed, what I claim is:

1. In a progressive change-speed mechanism, the combination of a motor flywheel adapted to turn at the speed of the motor; a driven shaft; a resistance gear on said shaft; a planet gear carried by the flywheel to revolve bodily therewith, and comprising a plate rotatably mounted on the flywheel and an externally toothed ring gear loosely encircling said plate and meshing with the resistance gear; a controlling member loosely related to said plate; a finger on the plate; a sleeve on the controlling member adapted to turn around said finger; a member having tracks of variable eccentricity in which said finger and sleeve are adapted to travel; and a coupling device operative by the controlling member for locking the plate and ring gear together.

2. In a progressive change-speed mechanism, the combination of a motor flywheel adapted to turn at the speed of the motor; a driven shaft; a resistance gear on said shaft; a planet gear carried by the flywheel to revolve bodily therewith, and comprising a plate rotatably mounted on the flywheel and an externally toothed ring gear loosely encircling said plate and meshing with the resistance gear; a controlling member loosely related to said plate; a finger on the plate; a sleeve on the controlling member adapted to turn around said finger; a member having tracks of variable eccentricity in which said finger and sleeve are adapted to travel, one track having a portion of its circumference eccentric to the other track so as to effect a movement of the controlling member relative to the plate; and a coupling device operative automatically by such relative movement for locking the plate and ring gear together.

3. In a progressive change-speed mechanism, the combination of a motor flywheel adapted to turn at the speed of the motor; a driven shaft; a resistance gear on said shaft; a planet gear carried by the flywheel to revolve bodily therewith, and comprising a plate rotatably mounted on the flywheel and a ring gear loosely encircling said plate and toothed both externally and internally, the external teeth meshing with the teeth on the resistance gear; a controlling member loosely related to said plate; a finger on the plate; a sleeve on the controlling member adapted to turn around said finger; a member having tracks of variable eccentricity in which said finger and sleeve are adapted to travel; toothed slides mounted on said plate for engagement with the internal teeth on the ring gear to lock the latter and the plate together; and means operative by the controlling member for actuating said slides.

4. In a progressive change-speed mechanism, the combination of a motor flywheel adapted to turn at the speed of the motor; a driven shaft; a resistance gear on said shaft; a planet gear carried by the flywheel to revolve bodily therewith, and comprising a plate rotatably mounted on the flywheel and an externally toothed ring gear loosely encircling said plate and meshing with the resistance gear; a controlling member associated with said plate; means for automatically effecting a movement of the controlling member relative to said plate; and coupling means operated by such relative movement to lock said plate and ring gear together.

5. In a progressive change-speed mechanism, the combination of a motor flywheel adapted to turn at the speed of the motor; a driven shaft; a resistance gear on said shaft; a planet gear carried by the flywheel to revolve bodily therewith, and comprising a plate rotatably mounted on the flywheel and an externally toothed ring gear loosely encircling said plate and meshing with the resistance gear; a controlling member associated with said plate; slides mounted on said plate for engagement with the internal circumference of the ring gear to lock the latter and the plate together; means for automatically effecting a movement of the controlling member relative to said plate; and means operative by such relative movement for actuating said slides.

6. In a progressive change-speed mechanism, the combination of a motor flywheel adapted to turn at the speed of the motor; a driven shaft; a resistance gear on said shaft; a planet gear carried by the flywheel to revolve bodily therewith, and comprising a plate rotatably mounted on the flywheel and an externally toothed ring gear loosely encircling said plate and meshing with the resistance gear; a controlling member associated with said plate; slides mounted on said plate for engagement with the internal circumference of the ring gear to lock the latter and the plate together; bell cranks for actuating said slides; means for automatically effecting a movement of the controlling member relative to said plate; and means operative by such relative movement for actuating said bell cranks.

7. In a progressive change-speed mechanism, the combination of a motor flywheel adapted to turn at the speed of the motor; a driven shaft; a resistance gear on said shaft; a planet gear carried by the flywheel to revolve bodily therewith, and comprising a plate rotatably mounted on the flywheel and a ring gear loosely encircling said plate and toothed both externally and internally, the external teeth meshing with the teeth on the resistance gear; a controlling member associated with said plate; toothed slides mounted on said plate for engagement with the internal teeth on the ring gear to lock the latter and the plate together; means for automatically effecting a movement of the controlling member relative to said plate; and means operative by such relative movement for actuating said slides.

8. In a progressive change-speed mechanism, the combination of a motor flywheel adapted to turn at the speed of the motor; a driven shaft; a resistance gear on said shaft; a planet gear carried by the flywheel to revolve bodily therewith, and comprising a plate rotatably mounted on the flywheel and a ring gear loosely encircling said plate and toothed both externally and internally, the external teeth meshing with the teeth on the resistance gear; a controlling member associated with said plate; toothed slides mounted on said plate for engagement with the internal teeth on the ring gear to lock the latter and the plate together; bell cranks for actuating said slides; means for automatically effecting a movement of the controlling member relative to said plate; and means operative by such relative movement for actuating said bell cranks.

9. In a progressive change-speed mechanism, the combination of a motor flywheel adapted to turn at the speed of the motor; a driven shaft; a resistance gear on said shaft; a planet gear carried by the flywheel to revolve bodily therewith, but capable of independent rotation about its own axis, said planet gear comprising outer and inner sets of teeth, the outer set meshing with the teeth on the resistance gear; a controlling member associated with the planet gear; means for automatically effecting a movement of the controlling member relative to the planet gear; and a toothed member operative by such relative movement to engage the inner set of teeth on the planet gear and thereby lock the same against rotation.

10. In a progressive change-speed mechanism, the combination of a motor flywheel adapted to turn at the speed of the motor; a driven shaft; a resistance gear on said shaft; a planet gear carried by the flywheel to revolve bodily therewith, but capable of independent rotation about its own axis, said planet gear comprising outer and inner sets of teeth, the outer set meshing with the teeth on the resistance gear; a controlling member associated with the planet gear; a shiftable plate for effecting a movement of the controlling member relative to the planet gear; and a toothed member operative by such relative movement to engage the inner set of teeth on the planet gear and thereby lock the same against rotation.

11. In a progressive change-speed mechanism, the combination of a motor flywheel adapted to turn at the speed of the motor; a driven shaft; a resistance gear on said shaft; a planet gear carried by the flywheel to revolve bodily therewith, but capable of independent rotation about its own axis, said planet gear comprising outer and inner sets of teeth, the outer set meshing with the teeth on the resistance gear; a controlling member associated with the planet gear; a finger on the planet gear; a sleeve on the controlling member adapted to turn around said finger; a member having tracks of variable eccentricity in which said finger and sleeve are adapted to travel, thereby to automatically effect a movement of the controlling member relative to the planet gear; and a toothed member operative by such relative movement to engage the inner set of teeth on the planet gear and thereby lock the same against rotation.

In testimony whereof I have signed this specification in the presence of two subscribing witnesses.

CHARLES EDOUARD HENRIOD.

Witnesses:
    M. CHAPMAN,
    M. RAITT.